United States Patent
Pinton et al.

(10) Patent No.: US 6,679,963 B2
(45) Date of Patent: Jan. 20, 2004

(54) PROCESS FOR THE PREPARATION OF ACRYLIC END-PRODUCTS FOR EXTERNAL USE

(75) Inventors: Mario Pinton, Marghera-Venezia (IT); Raffaele Tedesco, Venice (IT)

(73) Assignee: Montefibre S.p.A., Milan (IT)

( * ) Notice: Subject to any disclaimer, the term of this patent is extended or adjusted under 35 U.S.C. 154(b) by 169 days.

(21) Appl. No.: 09/987,522

(22) Filed: Nov. 15, 2001

(65) Prior Publication Data

US 2002/0100549 A1 Aug. 1, 2002

(30) Foreign Application Priority Data

Nov. 15, 2000 (IT) .................................. MI2000A002461

(51) Int. Cl.[7] .............................................. B32B 31/00
(52) U.S. Cl. ................... 156/157; 156/330.9; 442/167; 428/57
(58) Field of Search .............................. 156/157, 330.9; 428/57, 58; 442/167

(56) References Cited

U.S. PATENT DOCUMENTS

| 2,624,886 | A | * | 1/1953 | Herman ........................ 428/57 |
| 4,140,563 | A | * | 2/1979 | Sernaker ...................... 156/148 |
| 4,141,774 | A | * | 2/1979 | Ando et al. ............... 156/306.6 |
| 4,169,006 | A | * | 9/1979 | Matsubara et al. .......... 156/182 |
| 4,410,575 | A | * | 10/1983 | Obayashi et al. ............. 428/57 |
| 4,548,860 | A | | 10/1985 | Sakai et al. |
| 4,604,152 | A | * | 8/1986 | Liukko .......................... 156/93 |
| 4,776,916 | A | * | 10/1988 | Prunesti et al. .............. 156/291 |
| 4,863,063 | A | * | 9/1989 | Imazu et al. ..................... 220/8 |
| 5,845,869 | A | * | 12/1998 | Makino .................... 242/584.1 |
| 5,885,679 | A | * | 3/1999 | Yasue et al. ................... 428/57 |
| 6,497,934 | B1 | * | 12/2002 | Mahn et al. ................... 428/57 |

FOREIGN PATENT DOCUMENTS

| EP | 0 775 773 | 5/1997 |
| EP | 0 879 915 | 11/1998 |
| WO | WO 99/58586 | 11/1999 |

* cited by examiner

Primary Examiner—Mark A. Osele
(74) Attorney, Agent, or Firm—Oblon, Spivak, McClelland, Maier & Neustadt, P.C.

(57) ABSTRACT

A process is described for the preparation of end-products made of acrylic fiber, for external use, by the joining of one or more sheets with a copolyamide adhesive, resistant to solar light, the above junction been effected by the melting of said adhesive on the acrylic matrix and subsequent pressing of the glued area with a system capable of exerting an adequate pressure.

18 Claims, No Drawings

PROCESS FOR THE PREPARATION OF ACRYLIC END-PRODUCTS FOR EXTERNAL USE

The present invention relates to a process for the preparation of end-products for external use, made of acrylic fibre, which uses a copolyamide adhesive resistant to solar light.

Covers or sun shields, such as for example external awnings, are preferably made of acrylic fibre, either raw or dyed with pigments, which are extremely stable to solar radiation.

Preference for the use of acrylic fibre for the preparation of end-products exposed to the sun is due to the exceptional resistance of this fibre to solar radiation.

Whereas other fibres such as those deriving from polypropylene, cotton, polyester, etc., undergo a considerable deterioration in toughness after a few months of exposure to light, acrylic fibres remain unaltered and maintain almost all of their initial toughness after several years of exposure.

Pigments can be incorporated into acrylic fibres, which, if suitably selected, enable the mechanical resistance and the original brightness of the colours of the fibres to remain unaltered.

In order to produce end-products for external use having the desired dimensions, it is necessary to join sheets of acrylic fibre. This operation is typically effected with traditional seaming systems using threads of various materials, preferably of polyester or polyamide.

This system however, in addition to having a limited duration over a period of time for the parts of sewing threads exposed to solar radiation, also presents the problem of costs and thickness of the junctions.

The borders of the sewn sheets are, in fact, folded inwards and this increases the thickness of the sewn parts increasing the bulk when the awning is rolled up.

Under conditions of humidity or water absorption, the rolled-up awning is subject to greater stress on the area of the junctions and, as a result of the heat deriving from solar radiation, produces permanent and visible deformations, when the awning is unrolled, in the form of unaesthetic undulations.

For these reasons, a system has been studied for joining the borders of the sheets by means of adhesives.

Adhesives consisting of polyacrylates, synthetic rubbers, vinyl polymers, polyesters, polyurethanes, etc., are generally used, applied alone or with organic solvents.

These joining systems however have proved to be difficult to effect for the following reasons:
1. the use of organic solvents such as toluene, chlorinated hydrocarbons, acetone, etc. requires, during processing, the use of aspiration systems to limit their toxicity and can also give rise to fires, explosions, etc.
2. these adhesives have a lower mechanical resistance than that obtained with the traditional seaming system and they are not stable to solar exposure or weather-proof.

It has now been found, according to the present invention, that it is possible to overcome the drawbacks of the known art discussed above, by using a copolyamide adhesive for joining the borders of acrylic cloth. The use of this adhesive provides substantial advantages, in particular:
1. a mechanical resistance equal to or higher than that of traditional seaming systems;
2. a high resistance to light in terms of yellowing resistance and conservation of toughness;
3. a high physico-chemical affinity for the acrylic fibre which allows perfect wettability of the surface of the end-product, on the part of the adhesive, which results in the exceptional tensile strength of the junctions.

In accordance with this, the objective of the present invention relates to a process for the preparation of end-products for external use which comprises the joining of one or more sheets made of fabric essentially consisting of acrylic fibres by means of a copolyamide adhesive, the above junction being effected by applying said adhesive to the acrylic matrix by melting, with subsequent pressing in the glued area by means of a system capable of exerting an adequate pressure.

Copolyamide adhesives suitable for the purposes of the present invention are preferably selected from those consisting of a polyamide terpolymer based on 6/6.6/12 nylon and have the following characteristics:

melting point ranging from 115–130° C.;

glass transition temperature ranging from 15 to 20° C.;

viscosity of the molten product at 2.16 kg/160° C. ranging from 150 to 700 Pa.s.

These adhesives can be prepared with the known techniques and are also commercially available.

The adhesive, in powder form, can be used in aqueous dispersion in the form of a spreadable paste and is applied to the edge of one of the two sheets with subsequent pressing and melting of the adhesive by heating to about 150° C.

Alternatively, the adhesive in powder form is fed to a device heated to the melting point of the polymers and is spread, in a fine layer, on the edge of the fabric.

As the molten adhesive is applied on a layer of the fabric, the edge of the other sheet of fabric is overlapped, exerting a pressure which is sufficient to allow adhesion of the borders of the fabric.

For this purpose, calenders, flat plates or other devices capable of exerting adequate pressure, can be used.

The end-products for external use obtained using these adhesives have proved to be more resistant than those obtained using adhesives with a greater nominal mechanical resistance, for example adhesives based on copolyesters, but with a poor affinity with the acrylic fibre.

For these end-products, the thickness in the overlapping area of the edges is the sum of the thicknesses of the single sheets in addition to a negligible thickness of the molten adhesive. The width of the overlapping area of the two sheets glued by the copolyamide adhesive is in relation to the adhesion strength required.

The following examples are illustrative but do not limit the scope of the invention described.

EXAMPLES 1–11

Rectangular sheets of 20 cm×28 cm, with the long side parallel to the warp direction, were cut from an acrylic fibre fabric of 290 g/m$^2$.

The edges of the sheets of fabric were joined by applying the adhesive with a device consisting of a motorized screw extruder electrically heated to a temperature of 180° C., in which the adhesive products in powder form were fed from one end, whereas the other end of the extruder consisted of a tube having a diameter of 1 cm forming a downward angle and terminating with a flat spout having a 2 cm slit, suitable for spreading a thin layer of molten adhesive onto the edge of the fabric.

As the molten adhesive was spread onto one side of the fabric, the edge of the other sheet of fabric was overlapped, and an adequate pressure exerted by means of two chromium plated rolls which caused the two sheets of fabric to advance.

The following adhesives, in powder form, of EMS Chemie (Switzerland) were used in the experiments:
1. copolyamide adhesive Griltex 2 (Sample A)
2. copolyamide adhesive Griltex D1641A (Sample B)
3. copolyester adhesive Griltex D1539E (Control Sample C)
4. copolyester adhesive Griltex D1442E (Control Sample D)

All the samples were subjected to tensile strength tests according to the procedures indicated by the methods ASTM D1682 (test method for breaking load and elongation of fabrics) and ASTM D1683 (standard test method for seams in shuttle fabrics).

The tensile tests were effected according to two modes:
(I) in a tangent direction to the junction plane;
(II) in a perpendicular direction to the junction plane with the lifting of one of the joining edges.

The tensile tests were compared with the resistance of the fabric without junctions (E) and with two edges of fabric joined by a traditional seaming system with polyester thread (F).

The adhesives were subsequently evaluated with tensile tests at 0° C. and at 50° C. and after exposure to the Xenotest under storm conditions for 1000 hours, equivalent to 1 year of exposure to sun and storms.

The results are summarized in Table 1 below.

TABLE 1

| | | Breaking load in N/2 cm | | | |
|---|---|---|---|---|---|
| Sample | Tensile mode | Room temperature | 0° C. | 50° C. | Xenotest |
| E | (I) | 430 | 420 | 360 | — |
| F | (I) | 410 | n.d. | n.d | 337 |
| F | (II) | 40 | n.d. | n.d | n.d. |
| A | (I) | > fabric | > fabric | = fabric | > fabric |
| A | (II) | 45 | 47 | 40 | n.d. |
| B | (I) | > fabric | > fabric | = fabric | = fabric |
| B | (II) | 40 | 40 | 38 | n.d. |
| C | (I) | 300 | 320 | 250 | 150 |
| C | (II) | 5 | 6 | 4 | n.d. |
| D | (I) | 280 | 290 | 220 | 140 |
| D | (II) | 7 | 7 | 5 | n.d. |

> fabric means that the fabric breaks but not the glued part;
= fabric mans that at times the fabric breaks and at times the glued part breaks.
n.d. = not determined.

From the results indicated in the table, it can be observed that the end-products glued with adhesives based on copolyamides have performances equal to or higher than traditional seams; end-products glued with polymers based on copolyester have lower performances than traditional seams.

What is claimed is:

1. A process for the preparation of end-products for external use, comprising:
   joining one or more sheets made of fabric comprising mainly acrylic fibers using at least one copolyamide adhesive selected from the group consisting of copolyamide adhesives based on 6/6.6/12 nylon, by melting said copolyamide adhesive on the polymeric matrix of said acrylic fibers with an extrusion system heated to 180–200° C.

2. The process according to claim 1, wherein the sheets of fabric comprise raw acrylic fiber or pigmented acrylic fiber.

3. The process according to claim 1, wherein the copolyamide adhesive has a melting point ranging from 115° C. to 130° C. and a viscosity of the molten copolyamide adhesive at 2.16 kg/160° C. ranging from 150 to 700 Pa.s.

4. The process according to claim 1, further comprising spreading of the molten copolyamide adhesive onto an edge of a first sheet, and overlapping an edge of a second sheet with subsequent pressing of a glued area with a system capable of exerting an adequate pressure.

5. The process according to claim 4, wherein the system capable of exerting the pressure is a calender system or flat plate system.

6. The process according to claim 1, wherein the end-products are covers or sun-shields.

7. The process according to claim 6, wherein the sun-shields are external awnings.

8. The process according to claim 1, wherein a thickness of an overlapping area of the sheets is the sum of the thicknesses of the single sheets in addition to a negligible thickness of the molten copolyamide adhesive.

9. The process according to claim 1, wherein two sheets are joined, and
   wherein a width of the overlapping area of the two sheets glued by the copolyamide adhesive is in relation to the adhesion strength required.

10. A process for the preparation of end-products for external use, comprising:
    joining one or more sheets made of fabric comprising mainly acrylic fibers using at least one copolyamide adhesive selected from the group consisting of copolyamide adhesives based on 6/6.6/12 nylon, by melting said copolyamide adhesive on the polymeric matrix of said acrylic fibers;
    wherein a spreadable paste comprising said copolyamide adhesive in powder form in aqueous dispersion is applied to an edge of one of two sheets with subsequent pressing and melting of the copolyamide adhesive by heating to about 150° C.

11. The process according to claim 10, wherein the sheets of fabric comprise raw acrylic fiber or pigmented acrylic fiber.

12. The process according to claim 10, wherein the copolyamide adhesive has a melting point ranging from 115° C. to 130° C. and a viscosity of the molten copolyamide adhesive at 2.16 kg/160° C. ranging from 150 to 700 Pa.s.

13. The process according to claim 10, further comprising spreading of the molten copolyamide adhesive onto an edge of a first sheet, and overlapping an edge of a second sheet with subsequent pressing of a glued area with a system capable of exerting an adequate pressure.

14. The process according to claim 13, wherein the system capable of exerting the pressure is a calender system or flat plate system.

15. The process according to claim 10, wherein the end-products are covers or sun-shields.

16. The process according to claim 10, wherein a thickness of an overlapping area of the sheets is the sum of the thicknesses of the single sheets in addition to a negligible thickness of the molten copolyamide adhesive.

17. The process according to claim 10, wherein two sheets are joined, and
    wherein a width of the overlapping area of the two sheets glued by the copolyamide adhesive is in relation to the adhesion strength required.

18. The process according to claim 13, wherein the sun-shields are external awnings.

* * * * *

UNITED STATES PATENT AND TRADEMARK OFFICE
CERTIFICATE OF CORRECTION

PATENT NO. : 6,679,963 B2
DATED : January 20, 2004
INVENTOR(S) : Pinton et al.

It is certified that error appears in the above-identified patent and that said Letters Patent is hereby corrected as shown below:

<u>Title page,</u>
Item [75], Inventor, should read:
-- [75]  Inventors:  Mario Pinton, Marghera-Venezia (IT);
                       Raffaele Tedesco, Venezia (IT) --

Item [30], Foreign Application Priority Data, should read:
-- [30]    Foreign Application Priority Data
Nov. 16, 2000  (IT) ………………... MI2000A002461 --

Signed and Sealed this

Ninth Day of March, 2004

JON W. DUDAS
*Acting Director of the United States Patent and Trademark Office*